June 17, 1952
R. THOMAS
2,600,590
LIGHT DIVIDING APPARATUS FOR PRODUCING
TELEVISION IN COLOR
Filed Jan. 19, 1946
3 Sheets-Sheet 1
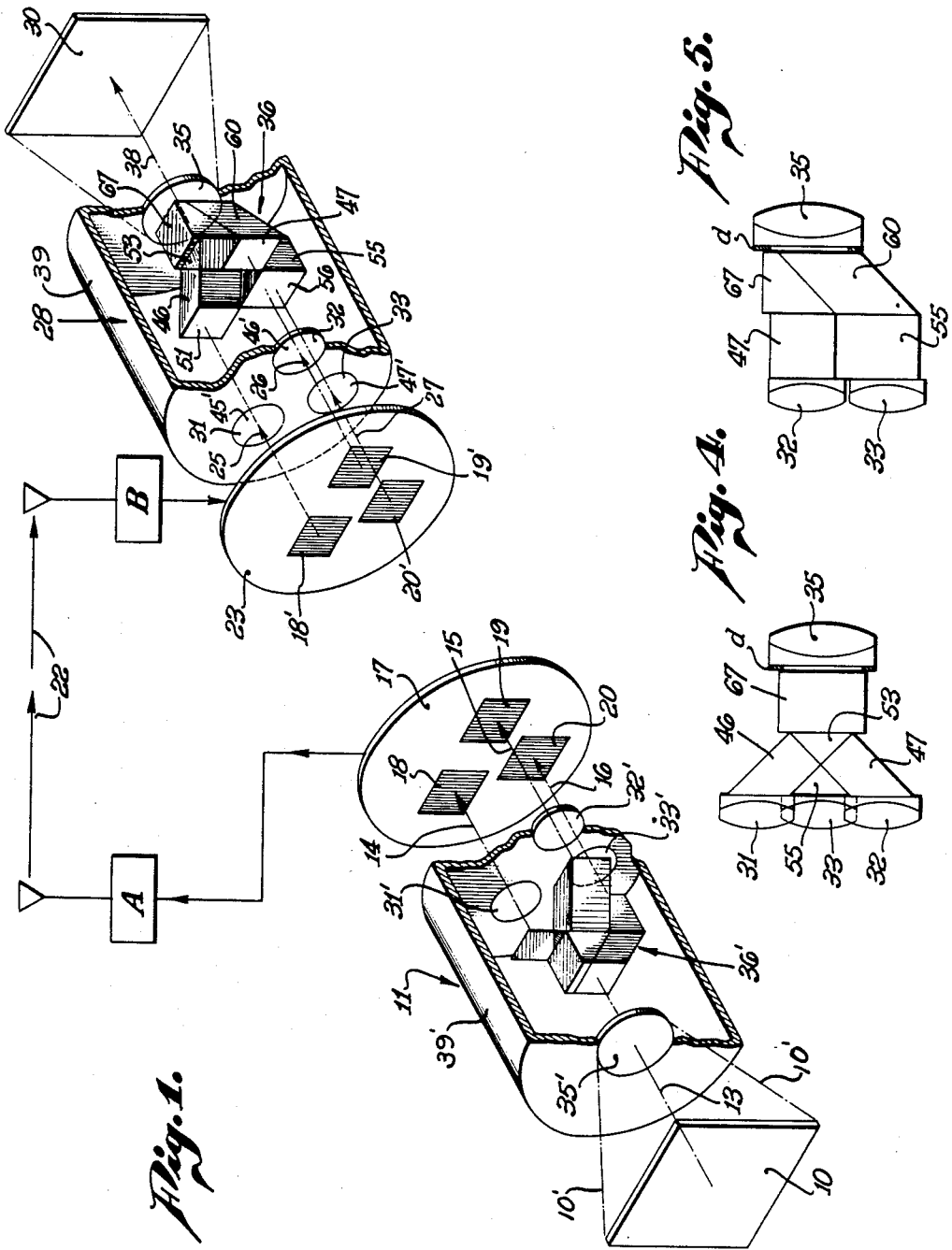
INVENTOR
Richard Thomas
BY
ATTORNEY

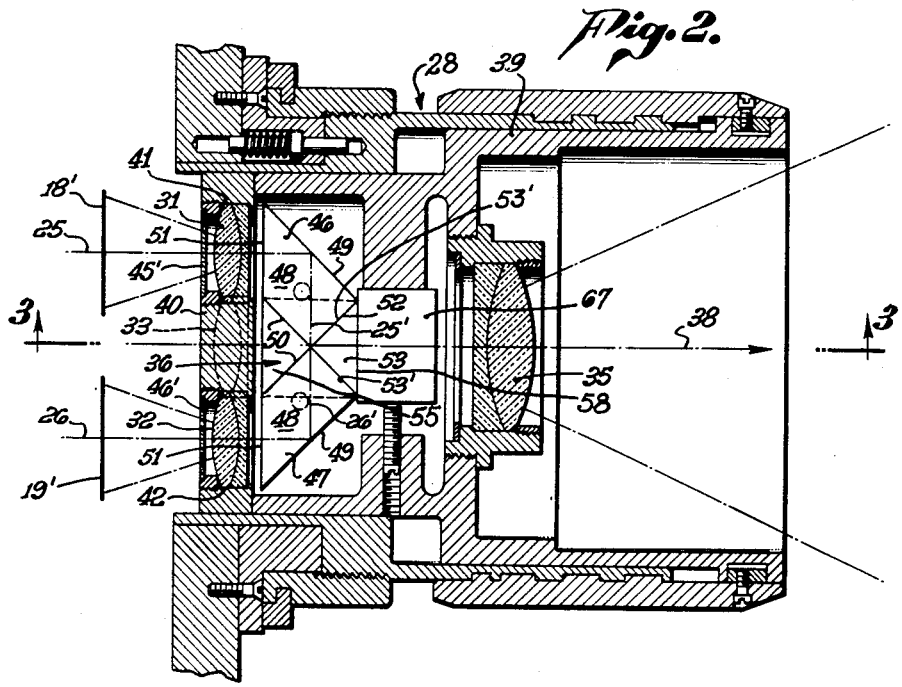
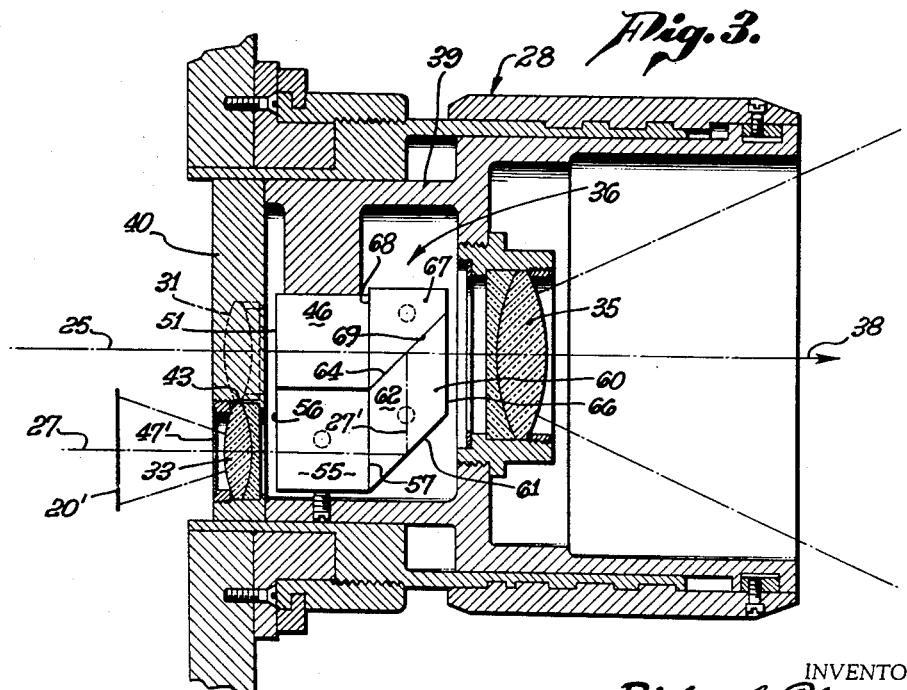

June 17, 1952

R. THOMAS 2,600,590

LIGHT DIVIDING APPARATUS FOR PRODUCING
TELEVISION IN COLOR

Filed Jan. 19, 1946

INVENTOR.
Richard Thomas
BY
ATTORNEY

Patented June 17, 1952

2,600,590

UNITED STATES PATENT OFFICE 2,600,590

LIGHT DIVIDING APPARATUS FOR PRODUCING TELEVISION IN COLOR

Richard Thomas, Westwood Village, Calif.

Application January 19, 1946, Serial No. 642,217

1 Claim. (Cl. 88—1)

My invention relates to the art of producing colored pictures by television and is also of especial importance to the production of colored pictures by other means, such as motion pictures, wire photo, etc.

It is an object of the invention to provide a simple and effective means and method whereby a colored picture of a colored object may be produced remotely of the object, either as to space or time, or both, wherein motion will occur in the image corresponding to motion occurring in the object. Herein the term "object" is used broadly so as to include natural scenes, stage sets and action thereon, inanimate things, etc., of which it is desired to produce a picture in color.

An important object of the invention is to provide a means which may be used in television to assemble a complement of color value images and project the same onto a screen or mirror where they may be reproduced for viewing, within the limits of space provided in television receiving sets for home use, wherein the viewing screen is only a relatively few feet from the projector as compared to the distance of 75–200 feet between the screen and the projector now used for projection of colored motion pictures from two or more complementary images.

It is an object of the invention to provide a colored picture projector wherein a plurality of complementary color value images are combined and projected onto a viewing screen disposed relatively close to the projector, and projector being characterized by ability to produce on the screen which is of large area in comparison to the short distance between the screen and the projector, a composite colored image which is free from defects resulting from parallax.

A further object of the invention is to provide a method and apparatus whereby complementary color value images are combined into a composite image in a light beam prior to the impingement of the light beam on the screen, and it is an object of the invention to combine all of these color value images on a single optical axis and thereby form the complete color image in a single bundle of light rays, which bundle of light rays is expanded and focused upon the screen as a single unit, thereby avoiding parallax and distortion of the colored image which occurs when an attempt is made to focus on a screen from separate optical axes the separate light beams carrying color value images which are simultaneously impinged upon the screen in an attempt to produce a satisfactory composite colored image on a screen of such size with relation to its distance from the point of projection as to require a wide angle of projection.

It is an object of the invention to provide a method and apparatus for producing a colored picture optically from an objective wherein the image of the objective is divided into complementary color value images which are subsequently recombined so as to produce a colored composite image, the invention being characterized by the novel feature of taking the color value images from the object along a single optical axis, and subsequently recombining these images or facsimiles thereof along a single optical axis, thereby avoiding the faults arising from parallax and image distortion encountered when separate color value images of an object are taken or picked up along separate axes, and reproductions of these color value images are combined on a screen by projecting the separate color value images along different optical axes which converge from their respective points of inception to substantially a single point on the screen.

It is an object of the invention to provide a method and apparatus for the optical production of colored pictures from complementary color value images, making possible the production of a large image on a screen through a short focus lens unit, thereby making it possible to dispose the projection apparatus and the screen relatively close together.

A further object of the invention is to enable the production of results such as set forth in the preceding paragraph by combining the color value images within the lens unit of multiple lens element type, between the front and rear elements of the lens, this simple lens being also suitable for dividing a composite color image into a plurality of complementary color value images and projecting such color value images onto a screen, which screen may be the image receiving part of a television broadcasting station or of a wire photo transmission system, or the image receiving element may be a sensitized photographic plate, film, or motion picture film.

A further object of the invention is to provide as a separate article of manufacture, a multiple element lens having an optical refraction element at one end thereof and a plurality of optical refraction elements at the other end thereof, each of which is complementary to the front element in the formation of a lens of desired principal focal length, and having between the front and rear elements of the lens a light directing means of simple form for bringing the optical axes of refraction elements at one end of the lens into coincidence with the optical axis of the refraction element at the opposite end of the lens.

It is an object of the invention to provide a dividing combining lens wherein a plurality of light paths which pass through separate full sized spherical lens elements at one end of the lens are combined so that their axes coincide and pass through a single spherical lens element at the opposite end of the lens.

Further objects and advantages of the invention will be brought out in the following part of the specification.

Referring to the drawings which are for illustrative purposes only:

Fig. 1 is a perspective schematic view of a preferred embodiment of my invention.

Fig. 2 is a sectional view of the separating-combining lens forming a part of the invention.

Fig. 3 is a section taken as indicated by the line 3—3 of Fig. 2.

Fig. 4 is a plan view of a short focus dividing-combining lens.

Fig. 5 is an elevational view of Fig. 4.

Figure 6:
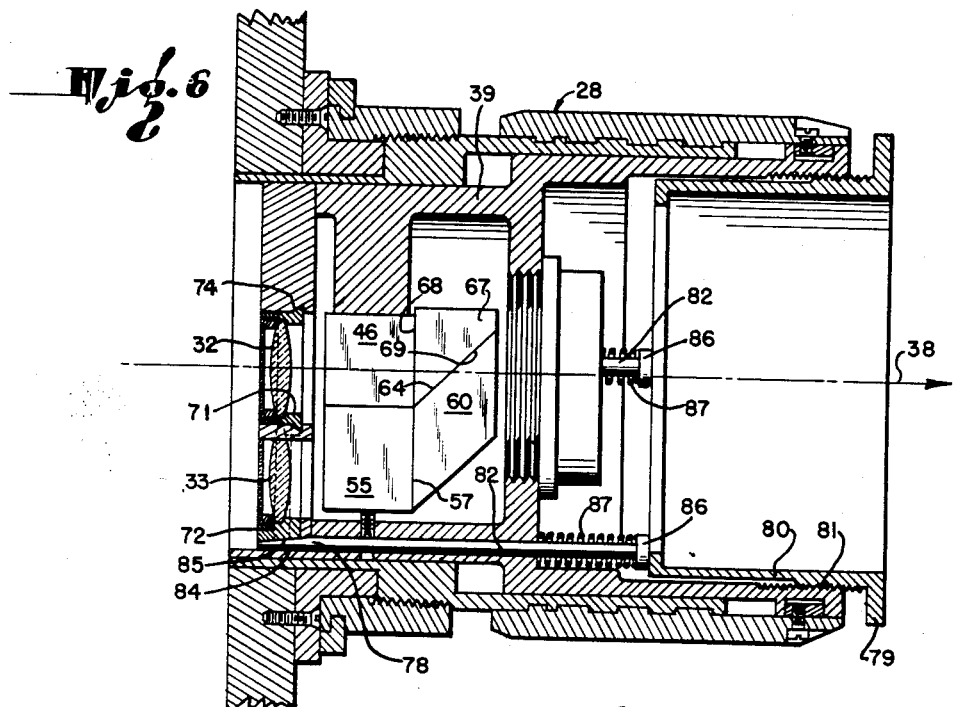
Fig. 6 is a sectional view similar to Fig. 3, showing an adjustable form of my new lens.

In the form of the invention shown in Fig. 1 I have schematically indicated an object 10 which comprises anything capable of being photographed and reflecting colors of the spectrum. Light from the object 10 is received by the objective lens 11 as a single light image, and is separated by the objective lens into a number of color separations, or complementary color value images. In Fig. 1 lines 10' indicate the transmission, into the objective lens 11 along the optical axis 13, of a single image from the object 10 represented by different gradations and colors of light, this original image being separated and projected along separated axes 14, 15, and 16, and being impinged on an image receiving member 17 as color separation images 18, 19, and 20.

The image receiving member 17 is any part capable of receiving, preserving, or transferring the images 18, 19, and 20. The image receiving member 17 is in the present disclosure a part of an image transmission means, such as a television system, wherein the member 17 comprises the receiving screen of a television broadcasting unit A. The image values are transmitted, as indicated by arrows 22 to a television receiving set B, and are reproduced on the screen or plate 23 of the kinescope of the television receiver B.

The color separation images 18', 19', and 20' produced on the screen 23 carry representations of the color values of the images 18, 19, and 20 in what is referred to as black and white—namely, different gradations of gray, or otherwise stated, different gradations or degrees of transparencies—to determine the different strengths of color values which are transmitted from the images 18', 19', and 20' along the spaced parallel axes 25, 26, and 27 of the projection lens 28. The light bundles from the complementary color value images 18', 19', and 20' are combined within the projection lens 28 into a single composite image which is projected from the lens 28 at a relatively wide angle onto the viewing screen 30 of the television receiving set. The lens 28, as schematically shown in Fig. 1, has three complete rear or inception lens elements 31, 32, and 33 on the parallel optical axes 25, 26, and 27 to receive light images from the color value images 18', 19' and 20'. The lens 28 has at its front or projection end a single lens element 35. Between the multiplicity of rear lens elements 31, 32, and 33, and the single front lens element, the lens 28 has light directing means 36 which takes the light images from the separate paths indicated by the axes 25, 26, and 27, and brings them together into a single path or line indicated by the optical axis 38 of the lens element 35. In the projection lens 28 the separate images 18', 19', and 20' are composed into a single light beam image by the light directing means 36 ahead of the front lens 35 so that a single image is projected from the lens element 35 onto the screen 30 which is relatively close to the projection equipment, that is to say—less than ten feet and probably in the neighborhood of four to six feet from the image producing member 23 of the television receiving set. Although I have schematically shown the image from the lens 28 passing directly to the screen 30, it will be understood that mirrors may be employed between the lens 28 and the screen 30 to provide the required length of light path.

The projection lens 28 shown in Fig. 1 and also in Figs. 2 and 3 with greater structural detail, has an axial dimension corresponding to an ordinary corrected multiple spherical refractor lens of approximately the same focal length, but instead of having a single rear lens element and a single front lens element, the applicant's projection lens 28 has a plurality of rear lens elements 31, 32, and 33 which are brought into optical correlation with a single front lens element 35 by the light directing element 36. The lens elements 31, 32, 33 and 35 which are of the achromatic type shown in Figs. 2 and 3, and the directing means 36 are all supported in a cylindric housing 39 of the customary form employed in picture projection and photography. This casing 39 has a rear wall 40 with a pair of upper apertures 41 and 42 to receive the lens elements 31 and 32 and below the apertures 41 and 42, to receive the lens element 33, there is a third aperture 43 disposed in the vertical plane defined by the optical axis 38 of Fig. 2. The external ends of the apertures 41, 42 and 43 are formed so as to receive across the faces of the lens elements 31, 32, and 33 respectively, complementary light filters 45', 46', and 47' whereby the desired colors are imparted to the light rays which are transmitted by the lenses 31, 32, and 33 to the light directing means 36 for combination into a single colored image.

The light directing means 36 has converging legs 46 and 47 comprising prisms of symmetric form lying in the same horizontal plane as the lens elements 31 and 32. These prisms 46 and 47 have upper horizontal faces 48 and outer vertical faces 49 disposed at angles of 45° respectively to the axes 25 and 26 of the rear lens elements 31 and 32. The prisms 46 and 47 likewise have vertical inner faces 50 parallel to the faces 49, and rear end faces 51 which confront the lens elements 31 and 32 and lie in a vertical plane which is perpendicular to the optical axes 25 and 26 of the lens elements 31 and 32. The prisms 46 and 47 have vertical front end faces 52 disposed in planes at right angles to the vertical walls 49 and 50 of the respective prisms 46 and 47. The prisms 46 and 47 are arranged so that the vertical front end face 52 of each prism will be coplanar with the face 50 of the other prism 46 or 47, leaving between the diverging front end faces 52 a V-shaped space in which a triangular prism 53 is fitted and cemented onto the front end faces 52 of the prisms 46 and 47.

As shown in Fig. 3, a rectangular prism 55 of optical glass is disposed on the optical axis 27 of the lens element 33, this prism 55 having a vertical rear face 56 which confronts the lens element 33 and is disposed in a plane perpendicular to the optical axis 27. The prism 55 has a front end face 57 which is also perpendicular to the optical axis 27 and is therefore parallel to the rear faces 51 of the prisms 46 and 47 and the rear face 56 of the prism 55, and is also aligned with or parallel to the plane defined by the front face 58 of the triangular prism 53.

The front face 57 of the prism 55 is cemented to the rear vertical face of a rhomboidal prism 60 having a lower face 61 disposed at an angle of 45° to the optical axis 27 and at the same time perpendicular to the vertical side faces 62 of the prism 60. The upper face 64 of the prism 60 is parallel to the lower face 61 and is therefore disposed at an angle of 45° to the optical axis 38 of the lens 35, which axis 38, as shown in Fig. 3, is in the same horizontal plane as the axes 25, 26 of the lens elements 31 and 32. The prism 60 has a front end face 66 which connects the rear edges of the faces 61 and 64 and crosses the axis 38 in perpendicular relation thereto. In the space between the upper face 64 of the prism 60 and the front end face 58 of the triangular prism 53 a triangular prism 67 is placed, the vertical rear face 68 of this prism 67 being cemented to the front face 58 of the prism 53 and the lower diagonal face 69 of the prism 67 being cemented to the upper face 64 of the prism 60.

The parallel faces 49 and 50 of the prisms 46 and 47 form reflectors, the faces 49 and 50 of each prism 46 or 47 being in the relation of first reflecting surface and second reflecting surface. The rear faces 53' of the triangular prism 53 are treated, as for example, by panchromizing, so as to form partial mirrors or light dividers. The surfaces 53' of the triangular prism 53, thus treated, constitute respectively reflective surfaces co-planar with the surfaces 50 of the prisms 46 and 47. Also, the upper surface 64 of the prism 60 is partially coated so that it will both transmit and reflect light. With the arrangement of prisms shown, light from the images 18' and 19' will pass inward through the lens elements 31 and 32 along the axes 25 and 26, this light, in each instance, being reflected by the surfaces 49 of the prisms 46 and 47 inwardly toward the respectively opposing surfaces 50 and 53' along the inwardly bent portions of the axes 25 and 26 indicated at 25' and 26', the two beams or bundles of light being then reflected rightwardly by the reflective surfaces 50 and 53' on the axis 38 of the lens element 35, the thus combined light rightwardly reflected passing through the prism 53, the prism 67 and the upper portion of the prism 60. As shown in Fig. 3, light from the image 20' passes rightward through the lens element 33 and the prism 55 along the axis 27 to the reflective lower face 61 of the prism 60, which reflects the light upward along the bent portion 27' of the axis 27 against the partial reflective surface 64 of the prism 60, which surface 64 reflects a portion of the light rightwardly along the axis 38 through the lens element 35. The three color value images are received by the lens 28 through the lens elements 31, 32, and 33 along the separate axes of such lens elements and these color value images are brought together within the lens 28, in the space between the lens elements 31, 32, and 33 and the lens element 35, so that the axes of the three color value images will coincide upon the axis 38 of the lens element 35.

An additional important advantage of the lens 28, with its self-contained internal light directing means, is that the image may be focused on the screen by the simple expedient of shifting the housing 39 axially in the same manner that a simple lens of a standard type projector or camera is shifted axially in order to focus the image of the object on the screen. The lens 28 may be of any desired focal length, and therefore may be made of such short focal length as to produce a large viewable picture on a screen within the limited space provided in the cabinet of a television receiver without sacrifice of or detraction from any of the advantages of the invention elsewhere set forth herein.

It will be understood that the lens 28 can be used either as a projector lens or as a camera lens.

From Fig. 1 it will be perceived that the objective or taking lens 11 is of the same construction as the projection lens 28 and its parts are supported in a housing 39'. The single lens element 35', which corresponds to the lens element 35 of the projection lens 28, is placed at the front of the objective lens 11 so as to receive light from the object 10 along a central axis 13. At the rear end of the objective lens, lens elements 31', 32', and 33', corresponding to the lenses 31, 32, and 33, are placed, and between the front lens element 35' and the rear lens elements 31', 32', and 33', a light directing member 36' is placed, with its single light receiving face disposed toward the lens element 35'. With this arrangement, the light from the colored object 10 is received along the optical axis 13 and by the light directing means 36' is divided into three separate bundles of light respectively centered on the axes 14, 15, and 16 which pass through the lens elements 31', 32', and 33', and are focused upon the member 17 so as to form the color value images 18, 19, and 20. It will be understood that filters are disposed across the light paths identified by the axes 14, 15, and 16, so that the images 18, 19, and 20 will be only of the colored light permitted to pass by the respective filters. As explained with relation to Fig. 2, the filters—such as filters 45', 46', and 47'—may be supported in positions across the faces of the lens elements or elsewhere in the paths of the three separate bundles of light which are to form the images 18, 19, and 20. The focusing of the images 18, 19, and 20 so that they will be brought out sharply may be accomplished by the simple expedient of adjusting the objective lens 11 axially between the colored object and the image receiving member 17.

In my present invention I provide a method and apparatus whereby a colored object image is transmitted in colored light values along a single optical axis, is divided into three separate images on three spaced axes, which images may be referred to as color value images, the color value images are reproduced on three separate axes and are transmitted in colored light values along these axes, are brought together onto a single projection axis and finally focused on a final receiving or viewing screen. Whether the images 18, 19, and 20 on the member 17 are positive or negative will depend upon the method of image preservation or transmission employed. If the member 17 is a sensitized motion picture film, the light images received along the separate axes 14, 15, and 16 will expose image areas which, upon development of the film, will result in the formation of negative images, and before reproduction of the color pictures, it will be necessary to print positive films from the negative films, under which circumstances the member 23 would be a portion of a positive film printed from the negative film, at present indicated by the member 17. Accordingly, in the practice of my invention by photographic method, the images 18', 19' and 20' are positive photographic images and in order to combine these images and bring them into viewing position on the screen 30, it will be necessary, in keeping with known methods of picture projection, to pass light through the images 18', 19', and 20' in rightward direction so as to carry light images rightwardly into the projection lens 28, where such images will be combined and finally projected upon the screen 30. It will be understood that the proper complementary colors can be imparted to the images 18', 19', and 20' in any of the manners employed in the coloring of positive motion picture film, or suitable filters may be set up in front of the images, or at any place along the paths of light indicated by the axes 25, 26, and 27.

Where my dividing and combining lens is to be made with extremely short focus, part or all of the spherical refracting lens elements may be disposed in direct contact with the planar refracting elements. For example, in Figs. 4 and 5, I show the manner in which the lens elements 31, 32, and 33 are balsamed or cemented onto the front faces of the prisms 46, 47, and 55 and the lens element 35 is connected directly to the rear end face of the prism 60, by the use of balsam or other suitable cement. In this instance a diaphragm d is shown cemented onto the rear face of the prism 66 and the lens element 35 is cemented to the diaphragm d. If desired, the lens element 35 need not be cemented in place as shown in Figs. 4 and 5, but a small space may be left between this lens element 35 and the prism 66 in which a suitable diaphragm may be positioned.

Figure 7:
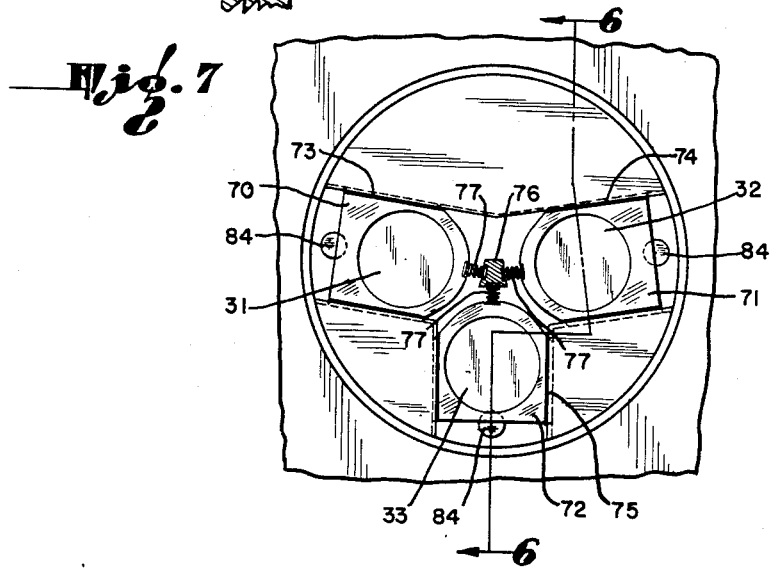
Fig. 7 is a view of the rear end of the lens shown in Fig. 6.

The lens 28 shown in Figs. 2 and 3 is in the form adapted for use in direct television broadcast. Where this lens is employed in indirect broadcast or on motion picture projectors, it has the form shown in Figs. 6 and 7, wherein it is provided with means to compensate for film shrinkage. It will be understood by those familiar with the motion picture art that film is subject to shrinkage during processing; therefore, the distance between the color value images on a film may be changed slightly from predetermined standard distances as the result of this shrinkage. In indirect television broadcasting the action upon the stage is photographed upon motion picture film, and a positive film of this action is then employed for the actual television broadcasting at any desired time after the film is made. Such television broadcast film has the general characteristics of motion picture film, although it may be of larger size. Any shrinkage of this film will move the color value images closer together. In my present invention I provide means for moving the axes 25, 26, and 27 of the lens 28, Fig. 1, so that these axes will be centralized with the images 18', 19', and 20', thereby providing for exact register of these images when they are superimposed upon the screen 30. In Fig. 6 I show a lens 28' which is the same as the lens 28 shown in Figs. 1, 2, and 3, with the exception that the rear lens elements 31, 32, and 33 are mounted in frames 70, 71, and 72 which are slidable in guides 73, 74, and 75 in the rear end wall 40 of the holder 39, these guides being disposed radially with respect to a center point 76 between the lens elements 31, 32, and 33. The lens frames 70, 71, and 72 are urged outwardly by small springs 77 and the positions of separation of the lens frames 70, 71 and 72 are controlled by cam means 78 adapted to be simultaneously adjusted by the turning of a ring 79 at the front end of the holder 39. This ring 79 is connected to a cylindric wall 80 threaded into the holder 39 at 81 so that when it is rotated by turning of the ring 79, it will move axially of the holder 39. The cam means 78 consists of pins 82 disposed in openings 83 in the holder in such positions that the tapered rear ends 84 thereof will engage the sloping end faces 85 of the frames 70, 71, and 72. The pins 82 have heads 86 at their forward ends and compression springs 87 urge the pins 82 rightwardly so that the heads 86 thereof will be held in engagement with the rear end of the cylinder 80. Accordingly, the positions of the pins 82 are determined by the position of the cylinder 80, the positions of the pins 82 in turn determining the separation of the frames 70, 71, and 72 by reason of the engagement of the tapered ends 84 of the pins 82 with the sloping end faces 85 of the frames 70, 71, and 72. This makes it possible for the user to quickly adjust the optical axes of the lens elements 31, 32, and 33 radially so as to accomplish perfect superimposition of the color value images of the viewing screen, merely by turning the ring 79.

I claim as my invention:

A lens mounting structure comprising: a support having parts adjustably movable toward and away from each other; a plurality of lens elements in side by side relation carried by one of said parts; a single focusing lens element carried by said one of said parts; and light directing means between said plurality of lens elements and said single lens element forming light carrying paths of substantially the same length, each passing within the light directing means through a single medium, one end of each of said light paths within the light directing means being disposed on one of the axes of said plurality of lens elements and terminating closely adjacent the associated lens, and the opposite end of each of said light paths being disposed on the axis of and terminating closely adjacent to said single lens element.

RICHARD THOMAS.

REFERENCES CITED

The following references are of record in the file of this patent:

UNITED STATES PATENTS

| Number | Name | Date |
| --- | --- | --- |
| 1,371,970 | Furman | Mar. 15, 1921 |
| 1,490,751 | Underhill | Apr. 15, 1924 |
| 1,699,226 | Cox | Jan. 15, 1929 |
| 1,859,023 | Burkhardt | May 17, 1932 |
| 2,050,224 | Gilmore | Aug. 4, 1936 |
| 2,097,706 | Thomas | Nov. 2, 1937 |
| 2,109,773 | Harding | Mar. 1, 1938 |
| 2,152,959 | Gilmore | Apr. 4, 1939 |
| 2,389,646 | Sleeper | Nov. 27, 1945 |